United States Patent Office 3,262,900

Patented July 26, 1966

3,262,900

MASKING COMPOSITIONS FOR PRINTED CIRCUITS

Guido Schreiber, 140 E. 40th St., New York 16, N.Y.

No Drawing. Filed Dec. 19, 1963, Ser. No. 331,967
6 Claims. (Cl. 260—29.6)

This invention relates, in general, to masking compositions. More particularly, the invention relates to masking compositions used in the preparation of printed circuits on dielectric materials, as described in U.S. patent application Ser. No. 264,784 filed March 13, 1963, of which the present application is a continuation-in-part. Masking compositions developed hitherto have resulted in poor definition of pattern, distortion of pattern by virtue of undesired flow on the surface of the base panel, uneven coating, carbonization, brittleness, lack of adhesion or cracking at elevated temperatures, lack of satisfactory adhesion at high air velocities during the metal spray operation, bubble formation and undesirable drying characteristics causing shape distortion of the product printed circuit. In addition, certain of the masking compositions suggested heretofore have been known to cause smoke formation in the process of manufacture whereby the resulting soot deposits cover unmasked areas of the screen, thus preventing metal deposition in those areas with consequent breaks or thin sections of printed circuit being formed. This defective deposition results, as do certain of the other effects alluded to hereinabove, in short-circuits which render the printed circuits involved inoperative.

Heretofore, the common method of preparing such panels (on enamelled metal or glass) has been to spray the metal on first, apply a masking composition in the desired circuit pattern, acid-etch the remaining, unmasked metal away, and then remove the masking. In application Serial No. 264,784 there are set forth certain soluble masking compositions which may be applied to the panels first in the areas where the circuit is not desired, and after spraying with metal the panel is washed and the masking, being water soluble, is removed, leaving only the desired circuit pattern. In the present invention, I have developed compositions to which the sprayed metal does not adhere and which only require brushing or rubbing after spraying, thus eliminating the washing step.

Accordingly, it is an object of the present invention to provide a masking composition which substantially obviates the aforesaid defects and disadvantages, and thus enables the production of printed circuits of excellent and uniform quality on aluminum, steel, and other metallic panels surfaced with vitreous enamels or other dielectrics.

A further object of the invention is to provide masking compositions which, after use, may be removed by mechanical means alone and which do not require washing.

A still further object of the invention is to provide masking compositions which are economical to prepare and effective in use.

Various other objects and advantages will appear in the following description of several embodiments of the invention, and the novel features will be particularly pointed out hereinafter in connection with the appended claims.

The compositions of the invention comprise from 2.5 parts to 91 parts of cerium or lanthanum oxide or, less desirably, oxides of aluminum, titanium, barium and silicon having a maximum particle size of less than 50 mesh; from 1 to 97 parts of a diluent and wetting agent such as, for example, propylene glycol, ethylene glycol, diethylene glycol, triethylene glycol; or 0.01 to 8 parts of a solution of a high molecular weight polymer of ethylene oxide characterized by a viscosity within a range of 225 centipoises (cps.) in a 5 percent aqueous solution to 4000 cps. in a 1 percent aqueous solution, at 25° C., prior to dilution for use in the practice of the invention. Less desirably, a solution of the copolymer of methylvinyl ether and maleic anhydride, (Gantrez AN, a tradename), having an intrinsic viscosity within the range of .1 to 3.5 centipoises (cps.) (e.g., .1 to .5 cps.; 1 to 1.5 cps., and 2.5 to 3.5 cps.), as measured from 0.1 percent solution in methylethyl ketone employing an Oswald-Fenske viscometer; and a solution of polyethyleneglycol having a molecular weight of about 950 to 7500; and mixtures of said diluents; together with 0.25 part to 93 parts water and .001 part to 95 parts of glycerine, and .01 to 10 parts of dimethyl silicone oil emulsion, can be used.

A procedure for preparing a base carrier panel comprises deposition of a vitreous, non-conductive, heat-resistant enamel coating or other dielectric on the metallic (e.g., aluminum, steel) base for a carrier panel, and overlaying the coated base after cooling with a silk screen. The silk screen is composed of a piece of silk cloth prepared or cut in such a manner that when the masking compound is subsequently applied to the screen surface a negative representation of the proposed circuit is produced on the carrier panel. The masking composition as prepared herein is then sprayed, painted, or otherwise deposited on the panel and covering screen surfaces. The employment of a silk screen is usually preferred since it permits an exact and uniform reproduction of the desired pattern. The screen is, of course, removed after the deposition of the masking composition. If desired however, the masking composition may be brushed or painted on the carrier panel in a defined pattern which outlines a desired circuit.

Following deposition of the masking composition the carrier panel is heated to a temperature up to about 800° F. at which temperature the entire surface of the carrier panel is sprayed with a conductive metal, e.g., copper, aluminum, etc., to establish the requisite printed circuit. The metal deposits selectively and continuously on the carrier panel in the circuit path, but not continuously on the part covered by the masking composition. The masking compositions of the invention, while adhering very well to the coated carrier base at elevated temperatures and high air and sprayed metal velocities employed, are then readily removed from the panel by simply rubbing with a rag or brush, leaving the sprayed metal coating on the enamel surface in the pattern provided by the aforesaid screen. As a result, printed circuits of a quality and definition superior to those known hitherto are prepared. In the case of screen printing the subject compositions do not smear and distort the pattern when the screen is raised; thus avoiding a significant disadvantage of many masking compositions suggested heretofore.

The preferred cerium and lanthanum oxides for use in the present invention have a particle size from .2 to 50 microns but preferably about 2 microns in size, at least 80% through a 325 mesh screen. Its bulk density is 140 lbs. per cubic foot. A monohydric alcohol of relatively low volatility normally from 2 to 5 carbon atoms and preferably isopropyl alcohol may be included efficaciously in the compositions of the invention, in a proportion within the range of 15 to 75 parts of the total composition.

Illustrative of other of these alcohols are ethanol, propanol, amyl alcohol, and butanol. While not essential, the presence of these alcohols tend to improve often the "burning-out" properties of the organic components of the masking compositions of the invention.

The water-soluble polyoxyethylene employed herein has a viscosity at 25° C., as indicated above, of 225 cps. to 4,000 cps. Preferred within this range are those polymers having a viscosity prior to dilution for use in the instant masking compositions, as measured in a 5 percent aqueous solution at 25° C., of 1500 to 2500 cps. (Polyox WSR 205, tradename); as well as those having a viscosity at 25° C., in a 1 percent aqueous solution of 2000 to 4000 cps. (Polyox WSR 301, tradename). Viscosity, as the term is employed herein with relation to ethylene oxide polymers, is that measured by a Brookfield viscometer RVF at two revolutions per minute using the largest spindle for the desired scale. While water is normally desired as the solvent for incorporation in the compositions of the instant application (particularly with polyoxyethylene, copolymeric methylvinyl ether—maleic anhydride and polyethyleneglycol), due to its comparatively slow rate of drying and economy, the ethylene oxide polymers are also conveniently utilized in monohydric and dihydric alcohols containing from one to five carbon atoms; illustrative members of which groups appear hereinabove and in the examples appearing hereinafter.

The percentage of ethylene oxide polymer in water or alcoholic solvent in the compositions of the invention is within the range of .01 percent to 1 percent and preferably from .02 percent to .5 percent. It is noted, parenthetically, that parts and percentages referred to throughout this specification are parts and percentages by weight unless otherwise explicitly indicated. The proportions of cerium and lanthanum oxides to diluent or viscosity control agent are significant in dictating the rate, area and uniformity of flow, thus determining, for example, whether the masking composition will begin to dry prematurely on the screen thus failing to cover the entire panel, or in the extreme, will reach the coated panel which is to be printed thus inducing distortions of the product circuit.

Other components in addition to those recited above may be included efficaciously in the formulation of the instant compositions. Thus, in order to assure avoidance of smearing, bubble formation, or change of shape of the printed area because of surface tension, even to a very limited degree, small quantities of a silicone oil and particularly dimethyl silicone emulsion, having a viscosity of about 250 to 450 centistokes preferably, for example, a 35 percent emulsion of dimethyl silicone oil having a viscosity of 350 centistokes (Union Carbide LE 45 emulsion and Dow-Corning 36 emulsion), normally within the range of .01 percent to 5 percent by weight, can be incorporated therein. Greater and lesser amonuts of silicone emulsion may be employed. The compositions of the invention are prepared by admixture of the ingredients in the proportions indicated. In addition to the unique advantages described hereinabove, the masking compositions thus prepared render with exact definition the circuit pattern desired, by virtue of their properties of consistency, uniformity, volatility and combustion. When deposited on a panel, the instant compositions neither smear nor run over. Further, on heating, the instant compositions decompose slowly, adhering to the coated panel or screen without blistering or cracking; nor do they evolve smoke or fumes which would deposit as carbonaceous residues on the purposely uncovered areas and which, when formed, tend to adhere to the vitreous coating of the panel or screen, and thus serve to prevent removal of the undesired portion of the sprayed metal from the printed circuit. It is noted that the printed circuits thus produced are suitable for many purposes, including heating panels. They may be adapted effectively to maintain constant temperatures, as cooling means, and for application is electronic circuitry and the like. The following examples are further illustrative of the invention.

*Example 1*

A silk screen is cut to a suitable pattern and placed on an aluminum carrier panel coated with a heat-resistant, non-conductive enamel. The silk screen is composed of a silk cloth, portions of which have been blocked out with a lacquer in such a manner that when the masking compound is subsequently applied to the screen surface a negative representation of the circuit to be formed is produced on its porcelainized carrier panel. The following components in the quantities indicated are then admixed to provide the masking composition:

| | Parts |
|---|---|
| Cerium oxide | 94 |
| Lanthanum oxide | 72 |
| Polyoxyethylene | .2 |
| Glycerine | 1 |
| Dimethyl siloxane | 5 |
| Distilled water | 60 |

The masking composition thus composed is brushed on the carrier panel and silk screen surface and the carrier panel is then heated to a temperature of about 800° F. after removal of the screen from the panel surface. At this elevated temperature the entire surface of the carrier panel is sprayed with a substantially uniform thickness of a conductive metallic alloy to establish the desired printed circuit. After cooling, the metallic spray coated panel is brushed or rubbed, thus removing the masking composition and any metal laying thereon. The continuous alloy coating adhering to the portions of the carrier panel uncoated with masking composition, and defined by the pattern of the silk screen, is the finished product.

*Example 2*

The following components are admixed to provide a masking composition which is employed in the manner described in Example 1:

| | Parts |
|---|---|
| Cerium oxide | 93.6 |
| Propylene glycol | 87.0 |
| Distilled water | 19.0 |
| Glycerine | 2.4 |
| Dimethyl siloxane emulsion (350 centistokes) | 0.2 |
| Isopropyl alcohol (70%) | 2.4 |

*Example 3*

The following components are admixed to provide a masking composition which is employed in the manner described in Example 1:

| | Parts |
|---|---|
| Titanium oxide | 93.6 |
| Propylene glycol | 87.0 |
| Distilled water | 19.0 |
| Glycerine | 2.4 |
| Isopropyl alcohol (75%) | 2.4 |
| Dimethyl siloxane emulsion (350 centistokes) | 0.2 |

*Example 4*

The following components are admixed to provide a masking composition which is then employed in the manner described in Example 1:

| | Parts |
|---|---|
| Aluminum oxide | 50.0 |
| Ethylene oxide polymer, viscosity of 1500 to 2500 cps. (Polyox WSR 205) | 0.3 |
| Distilled water | 60.00 |
| Glycerine | 0.29 |
| Dimethyl silicone emulsion | 1.5 |

*Example 5*

The following components are admixed to provide a masking composition which is then employed in the manner described in Example 1:

| | Parts |
|---|---|
| Cerium oxide | 250.0 |
| Ethylene oxide polymer, viscosity of 1500 to 2500 cps. (Polyox WSR 205) | 0.15 |
| Water | 300.00 |
| Glycerine | 1.45 |

The following are further illustrative examples of masking compositions encompassed within the purview of the present invention.

*Example 6*

| | Parts |
|---|---|
| Hydrated alumina silicate | 187.2 |
| Propylene glycol | 174.0 |
| Water | 150.8 |
| Glycerine | 4.8 |
| Isopropyl alcohol (70%) | 4.8 |

*Example 7*

| | |
|---|---|
| Cerium oxide | 187.2 |
| Propylene glycol | 174.0 |
| Water | 100.8 |
| Glycerine | 4.8 |
| Dimethyl silicone emulsion (350 centistokes) | 0.4 |
| Water 300.0 g.; ethylene oxide polymer, viscosity 2000 to 4000 cps. (Polyox WSR 301) 0.3 g. | 50.0 |

*Example 8*

| | |
|---|---|
| Lanthanum oxide | 93.6 |
| Propylene glycol | 87.0 |
| Water | 38.0 |
| Isopropyl alcohol (70%) | 2.4 |
| Glycerine | 2.4 |
| Dimethyl silicone emulsion (350 centistokes) | 0.2 |

*Example 9*

| | |
|---|---|
| Hydrated alumina silicate | 93.6 |
| Propylene glycol | 43.5 |
| Water | 38.0 |
| Glycerine | 2.4 |
| Isopropyl alcohol (70%) | 2.4 |
| Dimethyl silicone emulsion (350 centistokes) | 0.2 |

*Example 10*

| | |
|---|---|
| Hydrated alumina silicate | 93.6 |
| Propylene glycol | 43.6 |
| Ethylene oxide polymer, viscosity 2000 to 4000 cps. (Polyox WSR 301) (water solvent 5.0 g.) | 0.2 |
| Water | 33.0 |
| Isopropyl alcohol (70%) | 2.4 |
| Glycerine | 2.4 |
| Dimethyl silicone emulsion (350 centistokes) | 0.2 |

*Example 11*

| | |
|---|---|
| Hydrated alumina silicate | 96.6 |
| Propylene glycol | 87.0 |
| Water | 36.4 |
| Glycerine | 2.4 |
| Isopropyl alcohol (70%) | 2.4 |
| Cobalt blue | 0.8 |

*Example 12*

| | |
|---|---|
| Hydrated alumina silicate | 200 |
| Bentonite 325M | 133 |
| Ethylene oxide polymer, viscosity of 1500 to 2500 cps. (Polyox WSR 205) | 0.3 |
| Glycerine | 2 |
| Distilled water | 800 |

It will be understood that various changes in the details, materials and compositions, which have been herein described and illustrated in order to explain the nature of the invention, may be made by those skilled in the art within the principle and scope of the invention as expressed in the appended claims.

What is claimed is:

1. A masking composition for use in the production of printed circuits that comprises 2.5 to 91 parts of a finely divided powdered substance selected from a group consisting of oxides of cerium, lanthanum, barium, silicon, aluminum, and titanium; said powdered substance having a maximum particle size of 50 mesh; 0.01 to 97 parts of a diluent selected from the group consisting of ethylene glycol, propylene glycol, triethylene glycol, diethylene glycol, a high molecular weight ethylene oxide polymer, and a copolymer of methyl vinyl ether and maleic anhydride; 0.01 part to 8 parts of polyethyleneglycol; together with 0.25 part to 93 parts of water, 0.001 part to 95 parts of glycerine, and 0.01 part to 10 parts dimethyl silicone emulsion.

2. A masking composition for use in the production of printed circuits that comprises 2.5 to 91 parts of cerium oxide having a particle size no greater than 50 mesh, 1 to 97 parts of propylene glycol, 0.25 to 93 parts of water; 0.001 part to 95 parts of glycerine and 0.01 to 10 parts of dimethyl silicone emulsion.

3. In a process for producing a printed circuit on a non-conductive surface which employs a masking compound to mask areas on said surface other than where said circuit is desired, the improvements that comprise depositing in a defined pattern on said surface a masking composition that comprises 2.5 to 91 parts of a finely divided cerium oxide having a maximum particle size of 50 mesh, 1 part to 97 parts of propylene glycol; 0.25 part to 93 parts of water; and 0.001 part to 95 parts of glycerine and 0.01 to 10 parts of dimethyl silicone emulsion.

4. A masking composition for use in the production of printed circuits that comprises:

| | Parts |
|---|---|
| Cerium oxide | 40 |
| Lanthanum oxide | 53.6 |
| Propylene glycol | 87.0 |
| Water | 19.0 |
| Glycerine | 2.4 |
| Dimethyl silicone emulsion (350 centistokes) | 0.2 |
| Isopropyl alcohol (70%) | 2.4 |

5. A masking composition for use in the production of printed circuits that comprises:

| | Parts |
|---|---|
| Titanium dioxide | 93.6 |
| Propylene glycol | 87.0 |
| Water | 19.0 |
| Glycerine | 2.4 |
| Isopropyl alcohol (75%) | 2.4 |
| Dimethyl silicone emulsion (350 centistokes) | 0.2 |

6. A masking composition for use in the production of printed circuits that comprises:

| | Parts |
|---|---|
| Hydrated alumina silicate | 50.00 |
| Ethylene oxide polymer, viscosity of 1500 to 2500 cps. (Polyox WSR 205) | 0.3 |
| Water | 60.0 |
| Glycerine | 0.09 |
| Dimethyl silicone emulsion | 2.00 |

References Cited by the Examiner

UNITED STATES PATENTS

| | | | |
|---|---|---|---|
| 2,970,064 | 1/1961 | Bolton | 117—5.5 |
| 2,991,188 | 7/1961 | Wing et al. | 117—5.5 |

MURRAY TILLMAN, *Primary Examiner.*

W. J. BRIGGS, Sr., *Assistant Examiner.*